United States Patent
Shelton

[19]

[11] Patent Number: 6,129,621
[45] Date of Patent: Oct. 10, 2000

[54] SHRIMP DEVEINING APPARATUS AND METHOD

[75] Inventor: R. Douglas Shelton, Stuart, Fla.

[73] Assignee: Shelton Corporation, Enterprise, Fla.

[21] Appl. No.: 09/408,066

[22] Filed: Sep. 29, 1999

[51] Int. Cl.[7] .................................................. A22C 29/02
[52] U.S. Cl. ........................................................... 452/3
[58] Field of Search ........................................ 452/3, 2, 6

[56] References Cited

U.S. PATENT DOCUMENTS

| | | |
|---|---|---|
| Re. 24,115 | 1/1956 | Miller . |
| 2,034,691 | 3/1936 | Bottker et al. . |
| 2,263,695 | 11/1941 | Grayson .................................. 452/3 |
| 2,659,930 | 11/1953 | Jagger . |
| 2,665,449 | 1/1954 | Schneider et al. . |
| 2,702,921 | 3/1955 | Pinney . |
| 2,760,225 | 8/1956 | Miller . |
| 2,971,215 | 2/1961 | Sloan . |
| 3,040,374 | 6/1962 | Miller . |
| 3,345,682 | 10/1967 | Lapeyre . |
| 3,703,746 | 11/1972 | Jones, Jr. . |
| 3,787,928 | 1/1974 | Domecki . |
| 4,138,769 | 2/1979 | Andersen . |
| 4,210,982 | 7/1980 | Hoffman et al. . |
| 4,281,436 | 8/1981 | Hoffman et al. . |
| 4,393,543 | 7/1983 | Martin . |
| 4,745,660 | 5/1988 | Betts et al. . |
| 4,996,744 | 3/1991 | Meyer ..................................... 452/3 |
| 5,290,199 | 3/1994 | Morris . |
| 5,569,065 | 10/1996 | Sawyer et al. . |
| 5,613,903 | 3/1997 | Harris et al. . |

*Primary Examiner*—Willis Little
*Attorney, Agent, or Firm*—Allen, Dyer, Doppelt, Milbrath & Gilchrist, P.A.

[57] ABSTRACT

A shrimp deveining apparatus includes a housing with an entrance opening for receiving a shrimp and an exit opening for ejecting the shrimp from the housing after having the shell cut and deveined. Within the housing, a partition extends upwardly from a base and has an arcuate surface for slidably receiving a shrimp thereon. Opposing lever arms are rotatably attached to and carried on opposing sides of the partition for rotation about an axis. Each of the lever arms have their distal end radially extending beyond the arcuate surface of the partition for cradling the shrimp onto the arcuate surface. As the distal ends are rotated downstream the entrance opening, the distal ends are biased against the shrimp for securing the shrimp therebetween while the shrimp slides along the arcuate surface past dorsal and ventral cutting blades. The shrimp continues to be secured within the distal ends while the shrimp is carried past a brush positioned for sweeping of the vein from the now cut shell and thus exposed body of the shrimp. Once the vein has been swept from the severed shrimp, the biasing is reduced and the cut and deveined shrimp is ejected from the housing through the continued action of rotating the lever arm. Using a handle attached to the lever arms, they returned to a starting position for repeating the process with another shrimp.

34 Claims, 5 Drawing Sheets

SHRIMP DEVEINING APPARATUS AND METHOD

FIELD OF THE INVENTION

The present invention relates generally to mechanically processing shrimp, and more particularly to the cutting of the shell and removal of the vein from the body of the shrimp.

BACKGROUND OF THE INVENTION

The seafood industry has long been seeking to solve the problems associated with the peeling of the shell from a shrimp and removal of the sand vein in an efficient and economical manner, while at the same time producing a shrimp body having a desirable appearance. During the cutting of the shell prior to removal of the vein, the cutting blades often tear into the meat making many processed shrimp undesirable for presentation and useful, by way of example, only for a shrimp meat filling. There is a need for cutting the shell without damage to the meat, while still being able to effectively remove the shell and vein from the shrimp. By way of example, U.S. Pat. No. 3,345,682 to Lapeyre discloses the need for providing a clean-cut operation which preserves the integrity of the shrimp meat by individually cradling and securing one shrimp for cutting through a dorsal side of the shrimp and ripping out the vein.

By way of example for processing of large quantities, restaurants and retail stores have typically relied upon commercial processors for providing the peeled and deveined shrimp. Processors will typically rely on large machines such as those described in U.S. Pat. Nos. 2,760,224; 3,040,374 to Miller; 3,787,928 to Domecki, and 4,393,543 to Martin, such machines typically require motorized cutting and shrimp handling devices which are costly and cumbersome.

Further, in the interest of freshness and cost, there is a need for a machine that can be effectively used by in the home, by the small grocer, chef, and small seafood retailer, by way of example, without having the need for the high volume processing and experience demanded by of a commercial processor. There is a further need to be able to cut the shrimp for deveining and ease in manually peeling the shell from the desirable shrimp body in a timely manner, without the undesirable handling, and with the result of a desirable production for the effort and time spent. The cleaning and preparation of a fresh shrimp should not have unfavorably impact on available space, equipment cleaning and power demands.

SUMMARY OF INVENTION

In view of the foregoing background, it is therefore an object of the present invention to provide a shrimp deveining machine that is easily handled and economical for use in the home and small commercial establishments, such as a neighborhood grocery stores, seafood market, and restaurant.

This and other objects, features, and advantages of the invention, are provided by a shrimp deveining apparatus comprising a base and a partition upwardly extending from the base. The partition includes an arcuate surface for slidably receiving a shrimp. A lever arm has a proximal end rotatably attached to the partition and a distal end proximate the arcuate surface for receiving the shrimp in a cradling arrangement with the arcuate surface. Biasing means are operable with the lever arm for biasing the shrimp to the distal end. The biasing is employed as the lever arm is moved downstream the entrance opening toward the exit opening. A dorsal blade is positioned for cutting the shell of the shrimp along the dorsal side thereof as the shrimp is carried downstream along the arcuate surface. A brush is positioned downstream the dorsal blade for brushing the vein from the shrimp as the shrimp, now having a cut in the shell along the vein, is carried downstream past the brush.

A preferred embodiment includes a cover removably attached to the base and having an entrance opening for receiving a shrimp therethrough and an exit opening for ejecting the shrimp therefrom. A ventral blade opposes the dorsal blade for cutting the shell of the shrimp along the ventral side thereof. The biasing means comprise opposing first and second extension arms forming a passage therebetween for compressively receiving the distal end of the lever arm therethrough. In an alternate embodiment, the biasing means comprises opposing rollers forming a passage therebetween for compressively receiving the distal end of the lever arm therethrough for removably securing the shrimp to the distal end. A handle is attached to the lever arm for affecting movement of the lever arm.

A method aspect of the invention includes the steps of placing a shrimp onto an arcuate surface of the partition, biasing the distal ends of opposing lever arms against sides of the shrimp for cradling the shrimp within the distal ends and the arcuate surface, rotating the lever arms for sliding the shrimp along the arcuate surface, passing the shrimp past a dorsal cutting blade for cutting through the shell of the shrimp and exposing a vein carried therein, and sweeping the vein from the dorsal side of the shrimp for providing a deveined shrimp having a severed shell for manually peeling from the body.

BRIEF DESCRIPTION OF THE DRAWINGS

A preferred embodiment of the invention, as well as alternate embodiments are described by way of example with reference to the accompanying drawings in which.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
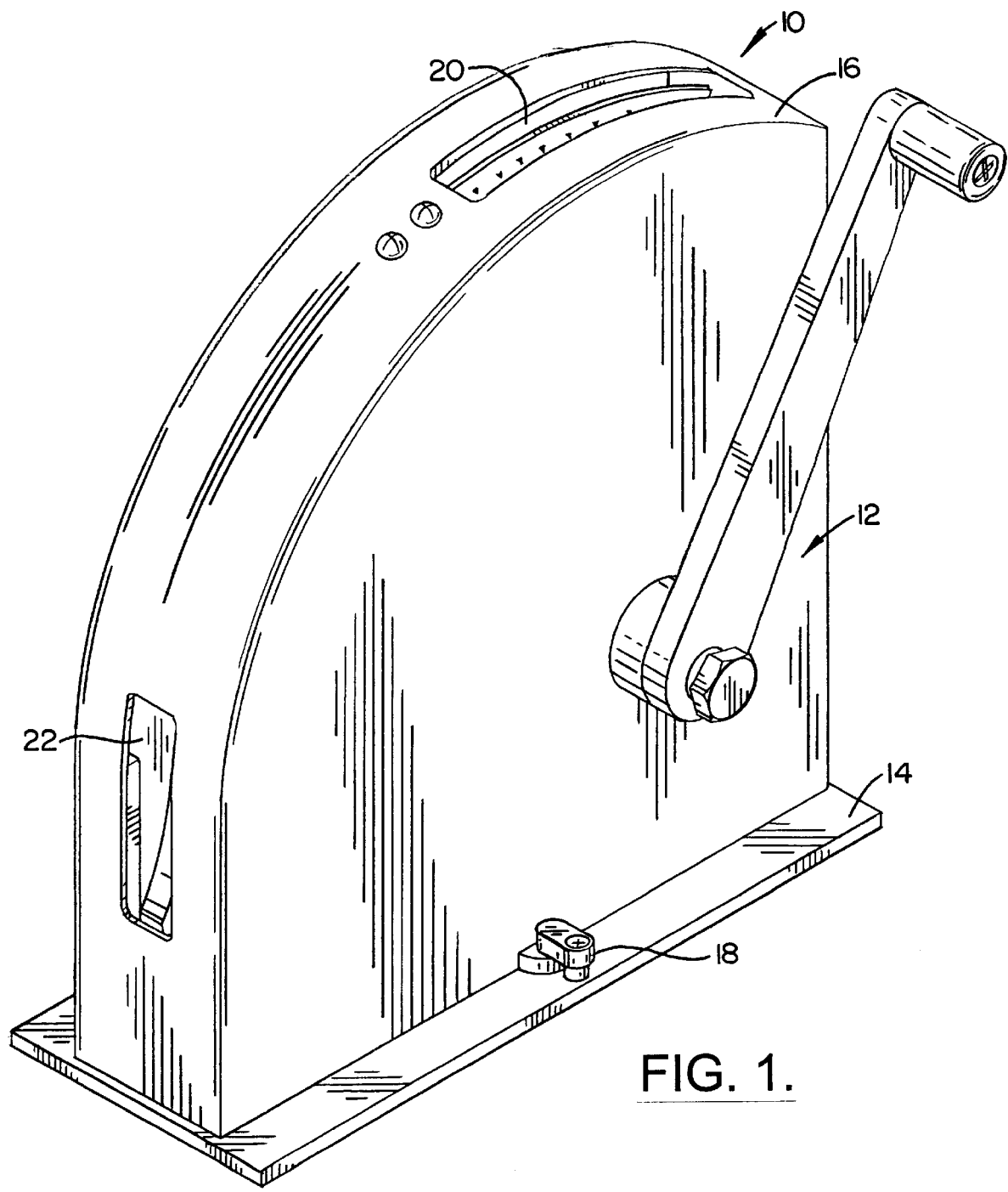
FIG. 1 is a perspective view of a shrimp cutting and deveining apparatus in accordance with the present invention.

With reference initially to FIG. 1, a shrimp deveining apparatus 10, in accordance with the present invention, comprises a housing 12 having a base 14 and a cover 16 removably attached the base. A clip 18 is carried between the base 14 and cover 16 for removably securing the cover to the base during operation yet allowing ease in removal for access into the housing 12 and cleaning. The housing 12 has an entrance opening 20 for receiving a shrimp therethrough and an exit opening 22 for ejecting the shrimp from the housing after it has been cut and deveined, as will be further detailed.

Figure 2A:
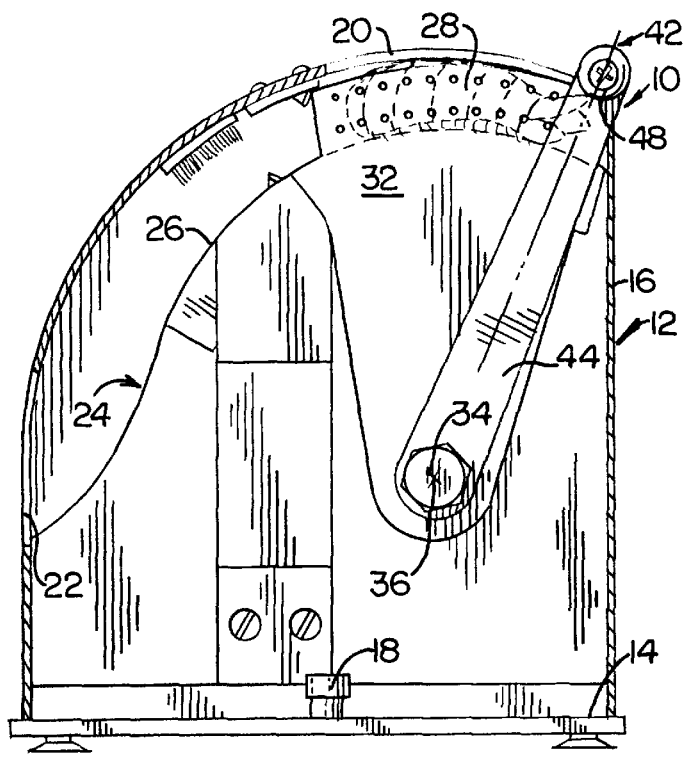
FIGS. 2A and 2B are partial cut-away views illustrating a first operable position of FIG. 1, wherein a headless shrimp is received therein.
Figure 2B:
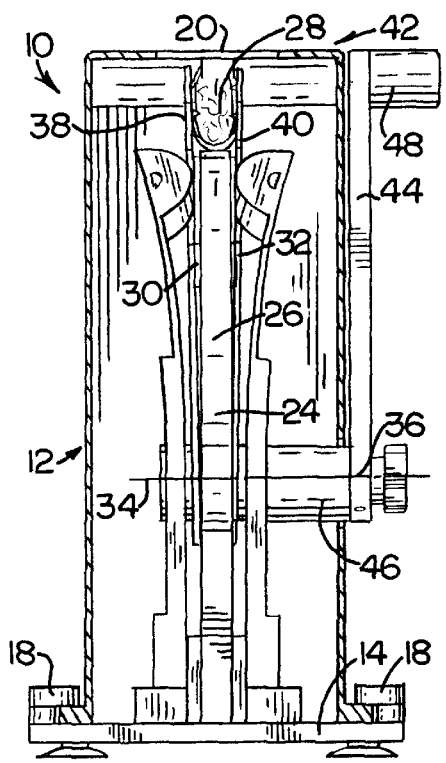

As illustrated with reference to FIGS. 2A and 2B, a partition 24, carried within the housing 12, is fixedly attached to and extends upwardly from the base 14. The partition 24 includes an arcuate topmost surface 26 for slidably receiving a shrimp 28 thereon. As herein illustrated and described, the shrimp has preferably had it head removed, although it is expected that those skilled in the art will appreciate that the present invention may be used to process the fully embodied shrimp. With continued reference to FIGS. 2A ans 2B, by way of example, first and second flexible lever arms 30, 32 are rotatably attached to and carried on opposing sides of the partition 24 for rotation about an axis of rotation 34 of a pivot pin 36. Each of the lever arms 30, 32 have their distal ends 38, 40 respectively, radially extending from the axis of rotation 32 beyond the arcuate surface 26 of the partition 24 for receiving the shrimp 28 therebetween in a cradling arrangement with the arcuate surface. The lever arms 30, 32 are rotational for placing the distal ends 38, 40 of the lever arms 30, 32 proximate the entrance opening 20 for receiving the shrimp 28 therethrough when the apparatus 10 is in a first operating position 42, as illustrated with reference to FIGS. 2A and 2B.

As further illustrated with reference to FIGS. 1, 2A and 2B, a handle 44 is fixedly attached to the lever arms 30, 32 through the shaft element 46 and rotatable about the pivot pin 36 for causing movement of the lever arms through a corresponding movement of the handle having a knob 48 rotatably attached.

Figure 3A:
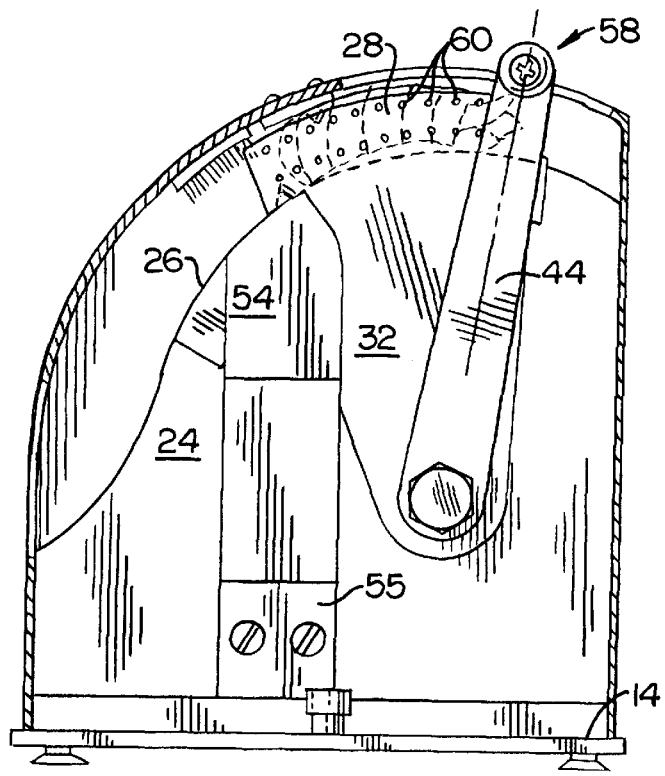
FIGS. 3A and 3B are partial cut-away views illustrating a second operable position of FIG. 1, wherein the shell of the headless shrimp is being cut.
Figure 3B:
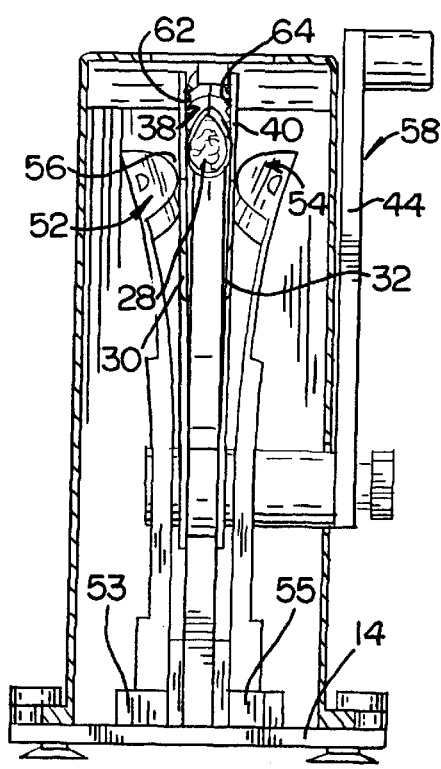

As illustrated with reference to FIGS. 3A and 3B, biasing means 50 becomes operable as the shrimp is initially moved downstream the entrance opening 20 for biasing the distal ends 38, 40 of the first and second lever arms 30, 32 against the sides of the shrimp and remains operable as the lever arms are rotated about the axis of rotation 34 downstream the entrance opening to and just upstream the exit opening 22, as will herein be described. In one preferred embodiment, illustrated with reference again to FIGS. 2A and 2B, the biasing means 50 comprise opposing first and second extension arms 52, 54 forming a passage 56 therebetween for restrictively and compressively receiving the distal ends 38, 40 of the first and second lever arms 30, 32 therethrough to inwardly displacement the distal ends toward the shrimp carried therebetween, and thus provide an enhanced frictional biasing of the distal ends against the shrimp 28, herein described as a second operable position 58 illustrated with reference to FIGS. 3A and 3B. In a preferred embodiment, the extension arms 52, 54 are attached at their proximal ends 53, 55 respectively, to the base 14, as further illustrated with reference to FIGS. 3A and 3B, by way of example. As further illustrated, a plurality of pins 60 is carried by inside facing surfaces 62, 64 of the distal ends 38, 40 for enhancing friction contact with the shrimp 28.

Figure 4A:
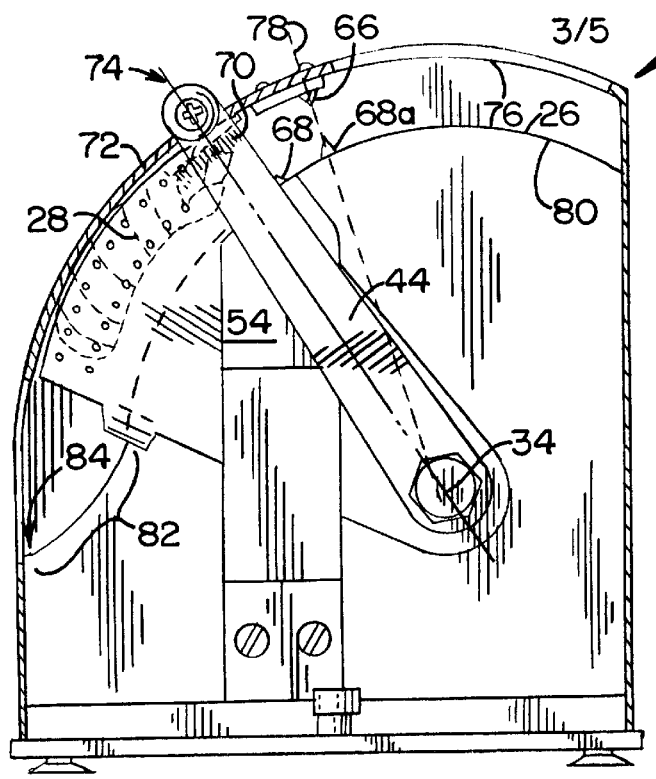
FIGS. 4A and 4B are partial cut-away views illustrating a third operable position of FIG. 1, wherein the shrimp vein is being brushed therefrom.
Figure 4B:
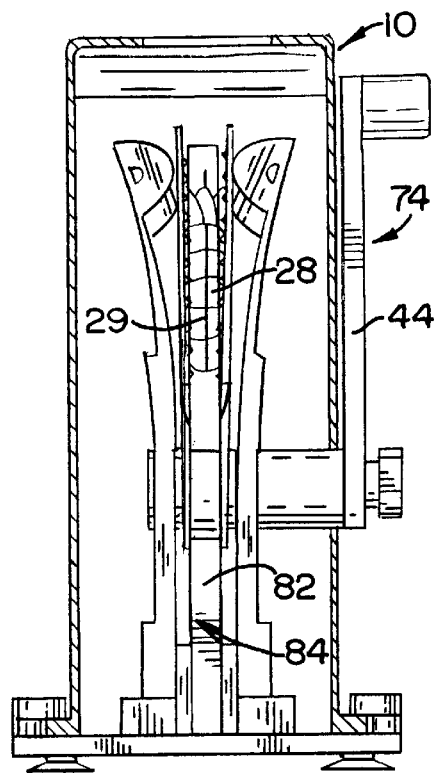

As illustrated with reference to FIGS. 4A and 4B, and again to 3A and 3B, a dorsal blade 66 and a ventral blade 68 are carried within the housing 12 for operating on the shrimp 28 as it is slid downstream along the arcuate surface 26. The dorsal blade 66 is positioned for cutting the shell of the shrimp along the dorsal side thereof and the ventral blade 68 positioned for cutting the shell of the shrimp along the ventral side thereof, as the shrimp 28 is carried along the arcuate surface 26 under a biasing force of the distal ends 38, 40 and the rotating first and second lever arms 30, 32. A brush 70 is carried within the housing 12 and positioned downstream the dorsal blade 66 for sweeping the vein from the dorsal side of the shrimp 28, as the shrimp, now having a cut 29 in the shell along the vein, is carried downstream past the brush as guided by the arcuate surface 26, herein illustrated as a third operating position 74 in FIGS. 4A and 4B. In the embodiment, herein described by way of example, the brush 70 is attached to an inside surface 76 of the cover 16, as is the dorsal cutting blade 66. The ventral cutting blade 68 is carried by the partition 24 and radially extends from the arcuate surface 26. In an alternate embodiment, the dorsal cutting blade 66 and ventral cutting blade 68 lie along a radial 78 extending from the axis or rotation 34, as illustrated in FIG. 4A with reference to numeral 68a.

Figure 5A:
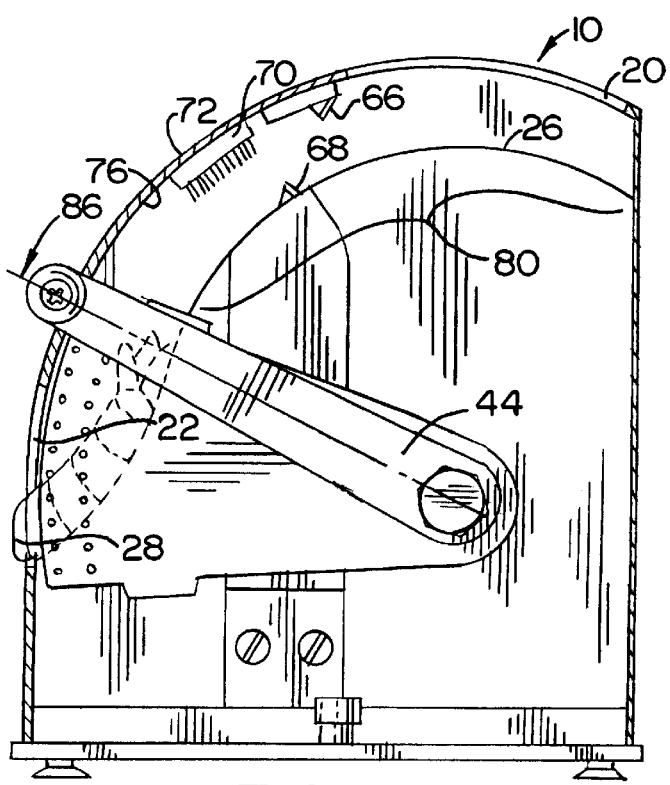
FIGS. 5A and 5B are partial cut-away views illustrating a fourth operable position of FIG. 1, wherein a cut and deveined shrimp is being ejected from a housing exit opening.
Figure 5B:
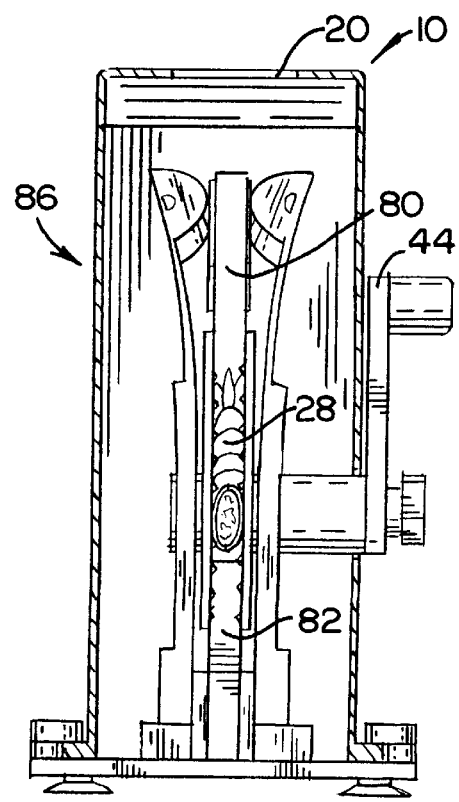

As illustrated with reference to FIG. 5A and again to 4A, the arcuate surface 26 comprises a generally convex shaped portion 80 proximate the entrance opening 20 and extending to just before the exit opening 22 where it then takes on a concave shape 82 to provide a ramp 84 adjacent to and leading into the exit opening 22 for ejecting the cut and deveined shrimp 28 from the housing 12 as the handle 44 is continued to be pulled for rotating the lever arms 30, 32 and advancing the shrimp 28 to a fourth operating position 86 of the apparatus 10 herein described, illustrated with reference to FIGS. 5A and 5B. Continued rotation of the handle 44 then fully ejects the shrimp 28 for manually peeling the shell therefrom as desired.

Thus, a method aspect of the present invention described with reference again the sequencing drawings of FIGS. 2A–5B, includes passing the shrimp 28 through the entrance opening 20 for placing the shrimp 28 onto the arcuate surface 26 of the a partition 24. Pulling the handle 44 for advancing the shrimp downstream wherein the distal ends 38, 40 of the opposing lever arms 30, 32 bias against the sides of the shrimp 28 for cradling the shrimp within the distal ends and the arcuate surface 26. Continued rotation of the handle 44 causes the lever arms 30, 32 to rotate and slide the shrimp 28 along the arcuate surface 26 taking it past the dorsal cutting blade 66 for cutting through the shell and exposing the vein. Continued rotation of the handle 44 causes the vein to be swept from the body of the shrimp 28 by the brush 70. Sweeping the vein from the dorsal side of the shrimp 28 provided a deveined shrimp having a severed shell for manually peeling from the body. Additionally, with the ventral cutting blade 68, the shell is peeled as desired.

Figure 6:
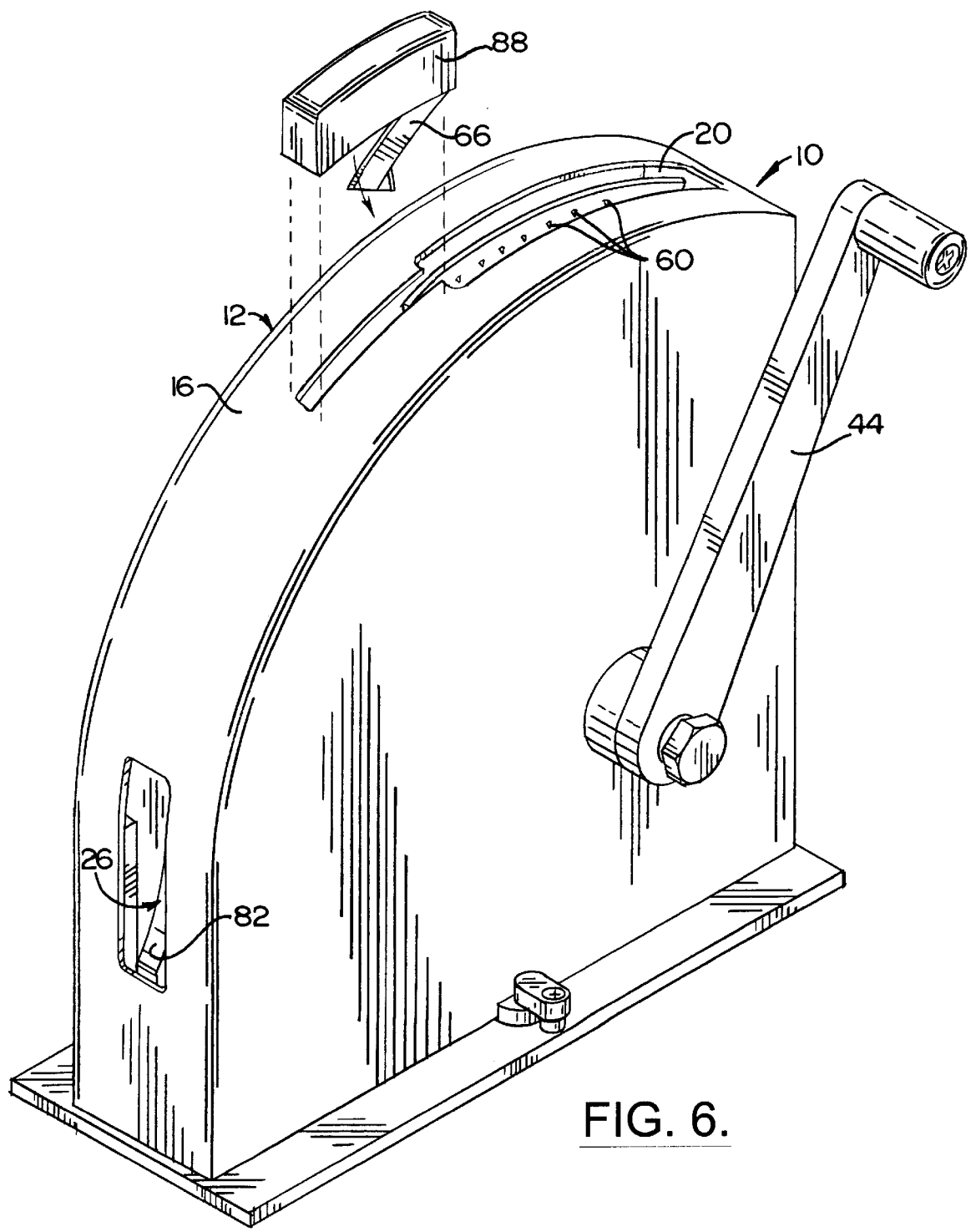
FIG. 6 is a partial exploded view of an alternate embodiment of the apparatus of FIG. 1.
Figure 7A:
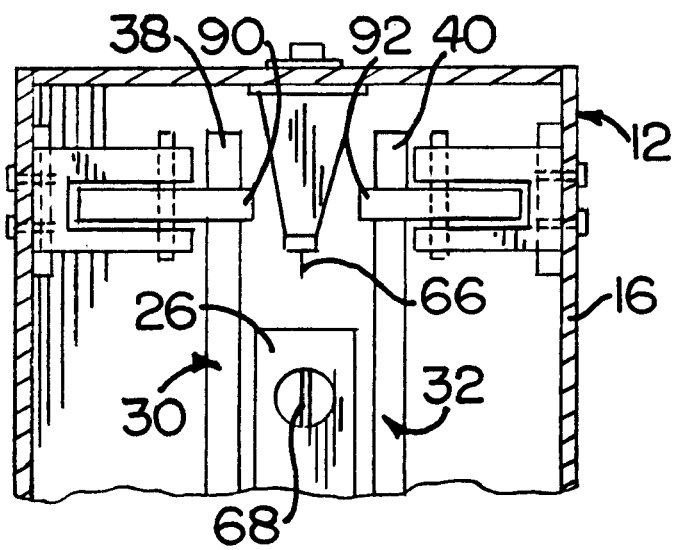
FIGS. 7A and 7B are partial plan and elevation views of an alternate embodiment for biasing lever arms which hold a shrimp therebetween.
Figure 7B:
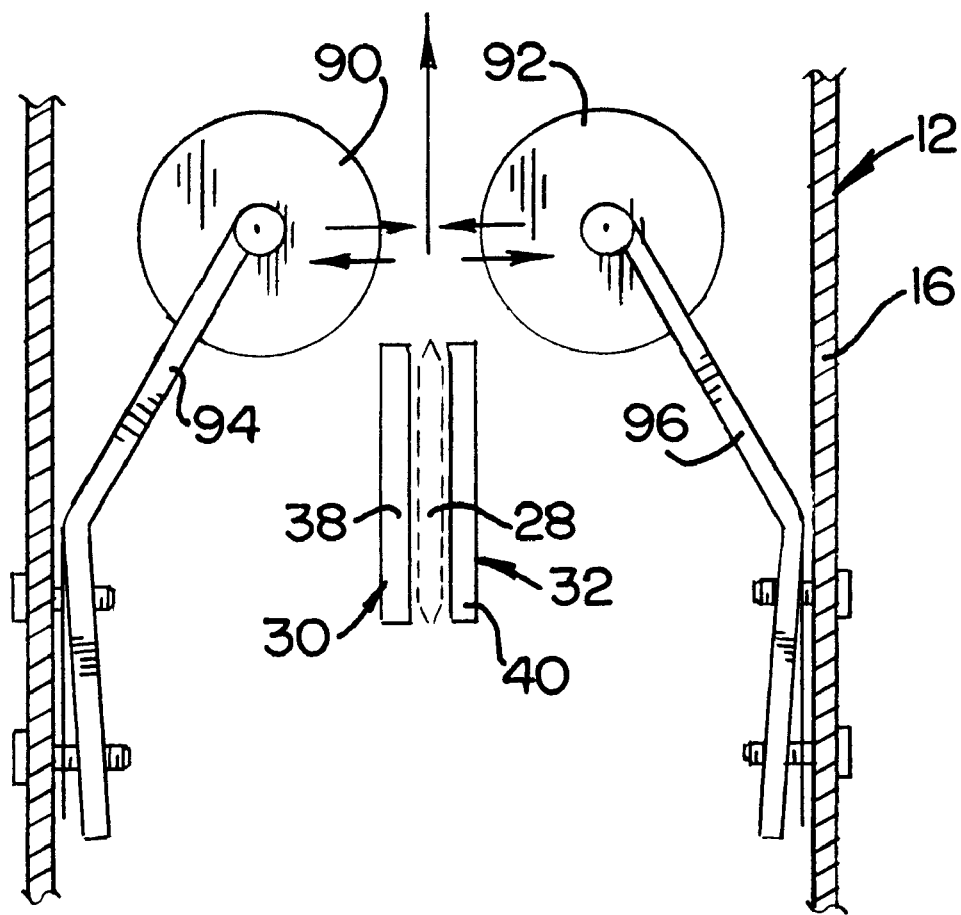

As illustrated with reference to FIG. 6, an alternate embodiment of the present invention includes the dorsal blade 66 pivotally carried within a removable portion 88 of the cover 16, wherein the dorsal blade is inwardly biased toward the arcuate surface 26. As illustrated with reference to FIGS. 7A and 7B, an alternate embodiment of the biasing means 50 includes opposing first and second rollers 90, 92 forming the passage 56 therebetween and inwardly biased through a spring mounting 94, 96 for compressively receiving the distal ends 38, 40 of the first and second lever arms 30, 32 therethrough to provide the displacement of the distal ends toward the shrimp 28 carried therebetween, as earlier described.

It is to be understood that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

That which is claimed is:

1. A shrimp deveining apparatus comprising:
   a housing having a base and a cover removably attached thereto, the housing having an entrance opening for receiving a shrimp therethrough and an exit opening for ejecting the shrimp therefrom;
   a partition carried within the housing and upwardly extending from the base, the partition having an arcuate surface for slidably receiving a shrimp thereon;
   first and second flexible lever arms carried within the housing, each of the first and second lever arms having a proximal end rotatably attached to and carried on opposing sides of the partition for rotation about an axis of rotation, each of the first and second lever arms having a distal end radially extending from the axis of rotation beyond the arcuate surface of the partition for receiving the shrimp therebetween in a cradling arrangement with the arcuate surface, wherein the lever arms are rotational for placing the distal ends of the firsts and second lever arms proximate the entrance opening for receiving the shrimp therethrough;
   biasing means carried by the housing for biasing the distal ends of the first and second lever arms against the shrimp and operable as the lever arms are rotated about the axis of rotation downstream the entrance opening toward and upstream the exit opening;
   a dorsal blade and a ventral blade carried by the housing, the dorsal blade positioned for cutting the shell of the shrimp along the dorsal side thereof and the ventral blade positioned for cutting the shell of the shrimp along the ventral side thereof as the shrimp is carried along the arcuate surface under a biasing force of the distal ends of the first and second lever arms; and
   a brush carried by the housing and positioned downstream the dorsal blade for brushing the vein from the shrimp as the shrimp, now having a cut in the shell along the vein, is carried downstream past the brush along the arcuate surface for ejecting from the exit opening of the housing.

2. An apparatus according to claim 1, further comprising a plurality of pins carried by facing surfaces of the distal ends of the first and second lever arms for enhancing friction contact with the shrimp.

3. An apparatus according to claim 1, wherein the biasing means comprise opposing first and second extension arms carried by the housing, the first and second extension arms forming a passage therebetween for compressively receiving the distal ends of the first and second lever arms therethrough to provide displacement of the distal ends toward the shrimp carried therebetween.

4. An apparatus according to claim 1, wherein the biasing means comprise opposing first and second rollers carried by the housing, the first and rollers forming a passage therebetween for compressively receiving the distal ends of the first and second lever arms therethrough to provide displacement of the distal ends toward the shrimp carried therebetween.

5. An apparatus according to claim 1, further comprising a handle fixedly attached to the first and second lever arms for affecting movement of the lever arms through a corresponding movement of the handle.

6. An apparatus according to claim 1, wherein the dorsal blade is pivotally carried by the housing and biased toward the arcuate surface.

7. An apparatus according to claim 1, wherein the ventral cutting blade is carried by the partition and radially extends from the arcuate surface.

8. An apparatus according to claim 1, wherein the dorsal cutting blade is carried by the cover.

9. An apparatus according to claim 1, wherein the arcuate surface comprises a convex shape proximate the entrance opening to proximate the exit opening and a concave shape forming a ramp adjacent the exit opening.

10. A shrimp deveining apparatus comprising:
    a base;
    a partition upwardly extending from the base, the partition having an arcuate surface for slidably receiving a shrimp thereon;
    a lever arm having a proximal end rotatably attached to the partition and a distal end proximate the arcuate surface for receiving the shrimp in a cradling arrangement with the arcuate surface;
    biasing means operable with the lever arm for biasing the shrimp thereto, the biasing means operable as the lever arm is moved downstream the entrance opening toward the exit opening;
    a dorsal blade positioned for cutting the shell of the shrimp along the dorsal side thereof as the shrimp is carried downstream along the arcuate surface; and
    a brush carried positioned downstream the dorsal blade for brushing the vein from the shrimp as the shrimp, now having a cut in the shell along the vein, is carried downstream past the brush.

11. An apparatus according to claim 10, further comprising a cover removably attached to the base, the cover having an entrance opening for receiving a shrimp therethrough and an exit opening for ejecting the shrimp therefrom.

12. An apparatus according to claim 10, further comprising a ventral blade opposing the dorsal blade for cutting the shell of the shrimp along the ventral side thereof.

13. An apparatus according to claim 12, wherein the ventral cutting blade is carried by the partition and radially extends from the arcuate surface thereof.

14. An apparatus according to claim 10, wherein the biasing means comprise opposing first and second extension arms forming a passage therebetween for compressively receiving the distal end of the lever arm therethrough.

15. An apparatus according to claim 10, wherein the biasing means comprise opposing rollers forming a passage therebetween for compressively receiving the distal end of the lever arm therethrough for removably securing the shrimp to the distal end.

16. An apparatus according to claim 10, further comprising a handle fixedly attached to the lever arm for affecting movement of the lever arm.

17. A shrimp deveining apparatus comprising:
    a partition having an arcuate top surface for slidably receiving a shrimp thereon;
    first and second flexible lever arms rotatably attached to and carried on opposing sides of the partition, each of the first and second lever arms having a distal end extending beyond the arcuate top surface of the partition for receiving the shrimp therebetween in a cradling arrangement with the arcuate top surface, biasing means for biasing the distal ends of the first and second lever arms against the shrimp as the lever arms are rotated downstream between opposing ends of the arcuate top surface;

a dorsal blade positioned for cutting the shell of the shrimp along the dorsal side thereof as the shrimp is carried along the arcuate top surface under a biasing force of the distal ends of the first and second lever arms; and a brush carried by the housing and positioned downstream the dorsal blade for brushing the vein from the shrimp as the shrimp is carried downstream further along the arcuate top surface.

18. An apparatus according to claim 17, further comprising a housing having a base to which base the partition is attached, the housing having a cover removably attached the base, an entrance opening for receiving a shrimp therethrough, and an exit opening for ejecting the shrimp therefrom.

19. An apparatus according to claim 17, further comprising a plurality of pins carried by facing surfaces of the distal ends of the first and second lever arms for enhancing friction contact with the shrimp during the biasing thereof.

20. An apparatus according to claim 17, wherein the biasing means comprise opposing extension arms forming a passage therebetween for receiving the distal ends therethrough and displacing the distal ends toward the shrimp carried therebetween.

21. An apparatus according to claim 17, wherein the biasing means comprise opposing first and second rollers forming a passage therebetween for receiving the distal ends of the first and second lever arms therethrough to provide displacement of the distal ends toward the shrimp carried therebetween.

22. A shrimp deveining method comprising the steps of:

providing a partition having an arcuate surface for slidably receiving a shrimp thereon;

placing the shrimp onto the arcuate surface of a partition;

pivotally attaching first and second lever arms on opposing sides of the partition, each of the lever arms having a distal end extending beyond the arcuate surface;

biasing the distal ends of the lever arms toward the shrimp for frictionally securing the shrimp within the distal ends and cradling onto the arcuate surface;

rotating the lever arms for guiding the shrimp along the arcuate surface;

passing the shrimp between dorsal and ventral cutting blades for cutting through the shell of the shrimp; and sweeping the vein from the dorsal side of the shrimp for providing a deveined shrimp having a severed shell for manually peeling from the body.

23. A method according to claim 22, further comprising the steps of covering the partition with a housing having an entrance opening for receiving the shrimp therethrough during the shrimp placing step, and an exit opening for ejecting the deveined and severed shrimp therethrough after the sweeping step.

24. A method according to claim 22, wherein the distal ends biasing step comprises the step of passing the distal ends through a passage for compressively receiving the distal ends and therethrough to provide displacement of the distal ends toward the shrimp carried therebetween.

25. A method according to claim 22, wherein the distal ends biasing step comprises the step of passing the distal ends between opposing rollers forming a passage therebetween for compressively receiving the distal ends therethrough to provide displacement of the distal ends toward the shrimp carried therebetween.

26. A method according to claim 22, further comprising the step of attaching a handle the lever arms for affecting movement of the lever arms.

27. A method according to claim 22, further comprising the steps of pivotally attaching the dorsal cutting blade for movement toward and away from the shrimp and biasing the blade toward the shrimp.

28. A method according to claim 22, further comprising the step of extending the ventral cutting blade from the arcuate surface.

29. A shrimp deveining method comprising the steps of:

placing a shrimp onto an arcuate surface of a partition;

biasing distal ends of opposing lever arms against sides of the shrimp for cradling the shrimp within the distal ends and the arcuate surface;

rotating the lever arms for sliding the shrimp along the arcuate surface;

passing the shrimp past a dorsal cuffing blade for cutting through the shell of the shrimp and exposing a vein carried therein; and sweeping the vein from the dorsal side of the shrimp for providing a deveined shrimp having a severed shell for manually peeling from the body.

30. A method according to claim 29, further comprising the steps of covering the partition with a housing having an entrance opening for receiving the shrimp therethrough during the shrimp placing step, and an exit opening for ejecting the deveined and severed shrimp therethrough after the sweeping step.

31. A method according to claim 29, wherein the distal ends biasing step comprises the step of passing the distal ends through a passage for compressively receiving the distal ends and therethrough to provide displacement of the distal ends toward the shrimp carried therebetween.

32. A method according to claim 29, further comprising the step of attaching a handle the lever arms for affecting movement of the lever arms.

33. A method according to claim 29, further comprising the steps of pivotally attaching the dorsal cutting blade for movement toward and away from the shrimp and biasing the blade toward the shrimp.

34. A method according to claim 29, further comprising the step of extending a ventral cutting blade from the arcuate surface for cutting a ventral side of the shrimp while sliding the shrimp along the arcuate surface.

* * * * *